Aug. 11, 1964  D. G. F. ANDERSON  3,144,111
CONVEYORS
Filed March 24, 1961
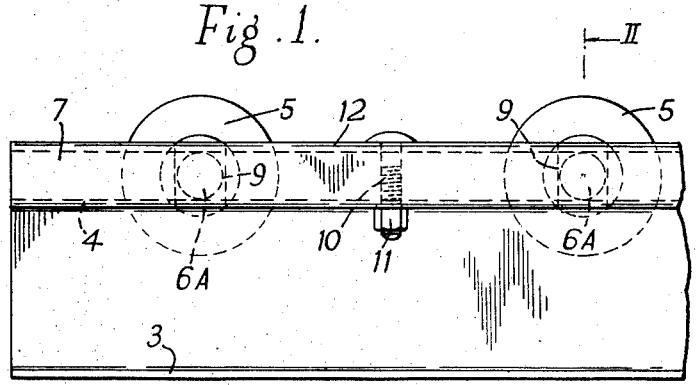
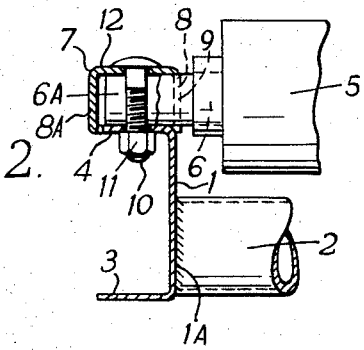
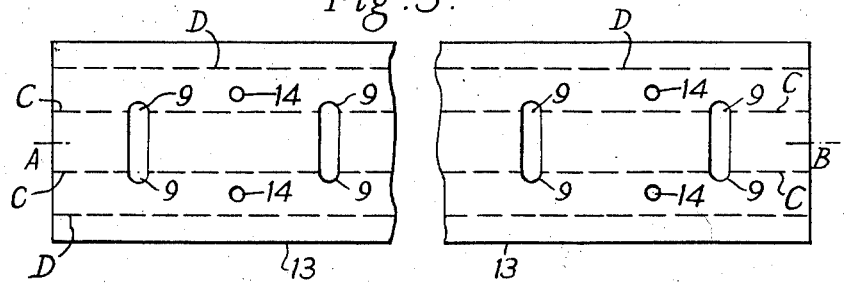
INVENTOR
Douglas Graeme Fordyce Anderson
BY
Mason, Kolehmainen, Rathburn & Wyss
ATTORNEYS

United States Patent Office 3,144,111
Patented Aug. 11, 1964

3,144,111
CONVEYORS
Douglas Graeme Fordyce Anderson, London, England, assignor to Baker Perkins, Inc., Saginaw, Mich., a United States corporation
Filed Mar. 24, 1961, Ser. No. 98,131
4 Claims. (Cl. 193—35)

This invention relates to conveyors, more particularly conveyors of the kind which have conveyor elements, such as rollers for example, arranged on spindles, extending transversely of a supporting frame, or wheels disposed side by side on such spindles. The principal object of the invention is to provide a conveyor having improved means for mounting the conveyor elements in or on the frame.

With the above object in view, the present invention consists of a conveyor, comprising a number of longitudinally-spaced conveyor elements which extend transversely of, and are supported upon, a supporting frame including at least two transversely-spaced, spindle-supporting members, each of which comprises a supporting part upon which the outer ends of spindles upon which the conveyor elements are rotatably arranged are supported, and one or more clamping members which, or each of which, is fixed to the said supporting part of one of the supporting members and which is so constructed as to act as a cover for the outer ends of all the spindles, or some of the spindles, supported upon the said supporting part, and which also provides a number of longitudinally-spaced openings in which the outer ends of the spindles with which they are associated are located and held against movement relatively to each other.

Each of the said conveyor elements may consist either of a single roller which is rotatably mounted upon a spindle or, alternatively, of a number of separate rollers or wheels which are rotatably mounted on a spindle.

The clamping member may be of inverted channel shape, the outer ends of the spindles with which the clamping member is associated being disposed between the flanges and web of the clamping member and between the web of the clamping member and the supporting part of the supporting member upon which the outer ends of the spindles are supported.

Constructional forms of the invention are described hereinafter wherein the inner flange of the clamping member is formed with a number of longitudinally-spaced, open-ended slots within each of which the outer end of one of the spindles is fitted, the clamping member thus acting as a cover for the outer ends of the spindles and as means for preventing the spindles moving relatively to one another.

The width between the inner surfaces of the flanges of the clamping member may be equal to or greater than, the width of the supporting part upon which the outer ends of the spindles are supported. In order to increase the bearing areas of the outer ends of the spindles bearing on the supporting parts of the supporting members, the bottom surfaces of the said ends may be provided with flats or equivalent.

Preferably, the clamping members are detachably connected to the said supporting parts of the supporting members. In the constructional form of the invention referred to above, the supporting frame comprises two transversely spaced spindle supporting members, each of which includes a supporting flange or equivalent upon which the associated outer ends of the spindles are supported.

One constructional form of the invention and a blank from which the clamping member is constructed are shown, by way of example, in the accompanying drawing, in which:

FIG. 1 is an elevation of a part of the clamping member;
FIG. 2 is a section on the line X—X in FIGURE 1; and
FIG. 3 is a plan view of part of the blank from which two clamping members are constructed.

Referring first to FIGURES 1 and 2:

The frame of the conveyor comprises two transversely-spaced channel-section side members 1, with tubular cross ties 2 extending transversely between the webs 1A of the flanges 3 and 4 of the channel members, the flanges forming smooth, continuous, planar supporting surfaces directed outwardly away from the axis of the conveyor.

The conveyor elements comprise parallel rollers 5 which are mounted for free rotation on stationary spindles 6 which extend transversely across the frame between the respective side members, the rollers also being parallel to the ties 2. Such a conveyor may be used, for instance, as a so-called "gravity-feed" conveyor, in which case it is mounted in an inclined position so that articles to be transported will move over the surfaces of the rollers 5 under gravity during free rotation of the rollers about their spindles.

The reduced end-portions 6A of the spindles 6 rest on the upper flanges 4 of the respective side-members and are secured in place by means of clamping members 7. Each clamping member serves to hold in place the ends 6A of a number of spindles and consists of a channel having parallel flanges 8 and 8A spaced by a web 12. The spacing between the flanges is substantially equal to, or slightly greater than, the width of the upper flange 4 of the side-member 1 to which it is fitted and the height of the flanges is slightly greater than the diameter of the end parts 6A of the spindles 6 to be secured.

The inner flange 8 of each channel-section clamping member is formed with elongated slots 9 which are open at the bottom of the flange and which are spaced from one another along the length of the corresponding side-member of the conveyor-frame at distances corresponding to the desired spacing of the axes of the rollers 5. Each slot 9 extends over the whole height of the flange 8 in which it is formed and its width is substantially equal to the diameter of the end-portion 6A of a spindle.

Thus when in the assembly of a conveyor of this form, the rollers 5 are placed with their spindle-ends 6A resting on the upper flanges 4 of the opposite side-members 1 of the frame at the desired spacings, a clamping member 7 such as has been described above can be dropped on to the end-portions 6A of a number of spindles, in inverted position, with the end-portions of the spindles engaging in the respective openings 9 in the flange 8 of the clamping member.

Since the depth of the channel-section clamping member 7 is greater than the diameter of the spindle-ends 6A, the flanges of the clamping member project downwardly over the inner and outer edges of the upper flange 4 of the side-member 1 to which the clamping member is fitted. This serves to locate the clamping-member relatively to the side-member. The clamping member is secured in position by means of headed bolts 10 and nuts 11 screwed upon the bolts, the latter being engaged through matching holes provided in the web 12 of the clamping member and in the upper flange 4 of the side-member. The clamping member thus serves to retain all the spindle-ends 6A in position.

Such a clamping member may be of substantially the same length as the side-member of the frame, in which case only one clamping member is fitted to each side-member. Alternatively it may be relatively short, so that a number of clamping members are used in conjunction with each side-member, each clamping member serving to retain in position the spindle-ends 6A of only a limited number of conveyor-elements.

The spindle-ends rest on the upper surfaces of the flanges 4 of the side-members 1, thus ensuring that the rollers 5 shall be disposed in proper alignment relatively to one another. The spindle-ends 6A are hidden inside the channel-section clamping members 7 so that the whole arrangement presents a neat appearance.

As an alternative to the use of bolts and nuts, the web 12 of each channel-section clamping member 7 may have threaded studs welded to it, so as to project from between its side-flanges. The studs will be arranged to engage in corresponding holes provided in the upper flanges 4 of the side-members 1 of the conveyor-frame and receive fixing nuts. Alternatively, the studs could be welded to the upper flanges 4 of the side-members 1 of the conveyor frame, so as to engage in holes provided in the webs 12 of the clamping members.

Clamping members of the form referred to above can be made very economically from a blank of strip-steel 13, FIG. 3, of a width double the total width of the web and flanges of a clamping member. Such a strip is first formed with a series of elongated slots 9, spaced apart at equal distances along its centre-line A–B and each arranged symmetrically with respect to the latter, and with a number of pairs of holes 14, the two holes of each pair being symmetrically disposed relatively to the centre-line A–B of the strip and each being spaced from the adjacent edge of the strip at a distance equal to one quarter the width of the strip. The slots and holes may be formed in one stamping operation.

The strip is then severed along its centre-line A–B so as to form two strips each having open-ended notches 9 spaced along one edge and holes 14 spaced along its centre-line. Each strip is then folded along two fold lines C and D spaced inwards at equal distances from the respective edges of the strip, so as to form the completed clamping member.

In order to increase the bearing areas of the spindle ends 6A on the flanges 4 of the side members 1, the bottom surfaces of the spindle ends bearing on the flanges could be provided with flats. Further, instead of making the side members of channel section they could obviously be of many other sections, such as of rolled steel joist or inverted angle section.

I claim:

1. A conveyor comprising a pair of spaced apart, upstanding, longitudinally extending supporting frames each of which terminates at its upper end in a laterally extending flange providing a smooth, continuous, planar, spindle supporting surface; a plurality of spindles spanning said frames and having their opposite ends supported on the supporting surfaces of the respective flanges; a clamping member for each of said frames, each of said clamping members comprising an elongated, walled member having one wall overlying and engaging the adjacent spindles, a second wall of each of said clamping members having openings spaced longitudinally thereof and receiving the ends of said spindles and spacing said spindles longitudinally of said frames; and means anchoring said clamping members to the flanges of the respective frames, the width of each of said flanges being such as to accommodate its associated anchoring means between its edges.

2. The apparatus set forth in claim 1 wherein each of said clamping members includes a third wall parallel to and spaced from said second wall, said one, second and third walls together forming a channel.

3. The apparatus set forth in claim 2 wherein the spacing between said second and third walls is at least as great as the width of the flange of the associated frame.

4. The apparatus set forth in claim 2 wherein the spacing between said second and third walls is greater than the width of the flange of the associated frame.

References Cited in the file of this patent

UNITED STATES PATENTS 2,696,283     Barry                 Dec. 7, 1954